United States Patent [19]
Wilburn

[11] 3,990,536
[45] Nov. 9, 1976

[54] PORTABLE ENCLOSURE

[76] Inventor: James B. Wilburn, Rte. 6, Box 281, Poplar Bluff, Mo. 63901

[22] Filed: May 21, 1975

[21] Appl. No.: 579,374

[52] U.S. Cl. .................................. 182/20; 182/129; 182/187; 9/5; 224/11
[51] Int. Cl.² ........................ A45F 3/00; A47C 9/10
[58] Field of Search ............ 135/1 R, 5 R, 5 C, 5 E; 224/9, 10, 5.1; 182/187, 129, 20; 9/5; 114/43

[56] References Cited
UNITED STATES PATENTS

| | | | |
|---|---|---|---|
| 3,220,766 | 11/1965 | Kates | 182/20 |
| 3,266,686 | 8/1966 | Griffith | 224/9 |
| 3,352,313 | 11/1967 | Kroening | 135/1 R |
| 3,358,789 | 12/1967 | Laun | 182/187 |
| 3,395,664 | 8/1968 | Greenberg | 114/43 |

*Primary Examiner*—Reinaldo P. Machado
*Attorney, Agent, or Firm*—Gravely, Lieder & Woodruff

[57] ABSTRACT

A portable enclosure has a base on which a seat, a back rest, and canopy are supported. The front, bottom, sides and back of the enclosure are closed by curtains, with the front curtains being held upright on poles which project upwardly from stabilizing arms which in turn are fitted into the base. The space enclosed by the curtains is warmed with heater. The enclosure may be reduced to a highly compact condition by removing the seat and placing the forward stabilizing arms in hollow seat posts on which the seat normally rests. The canopy also lowers and is to a limited extent disassembled and stored on the base. The heater likewise fits on the base. The back rest is turned around and forms a back pack for easily transporting the enclosure.

16 Claims, 12 Drawing Figures

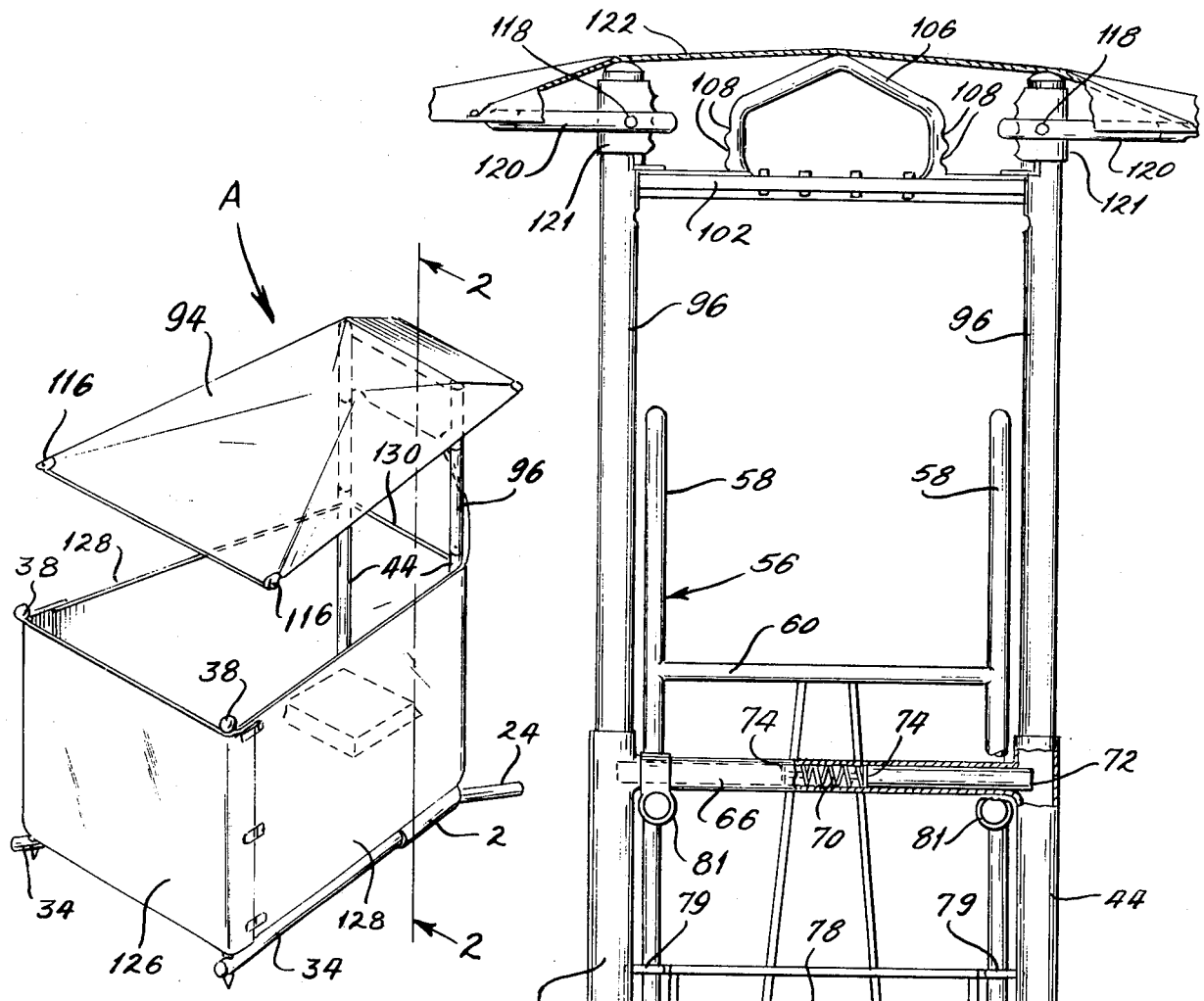
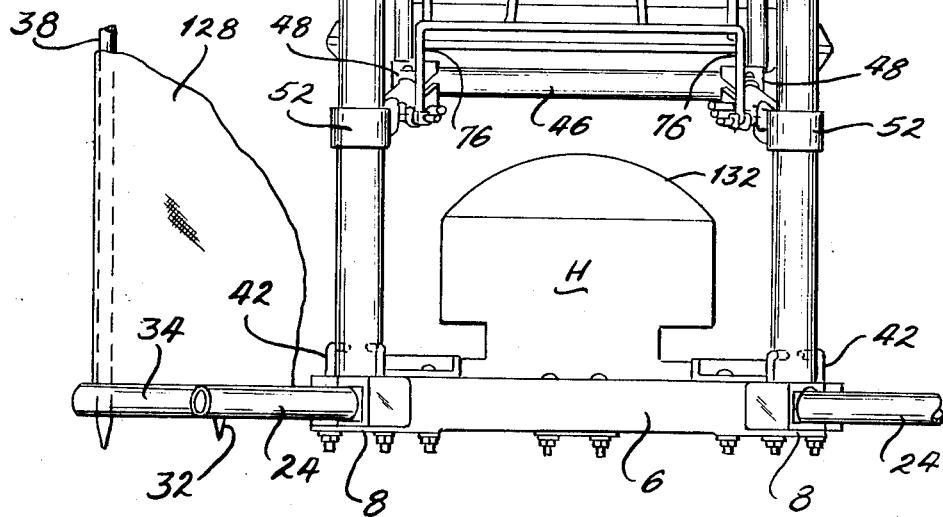

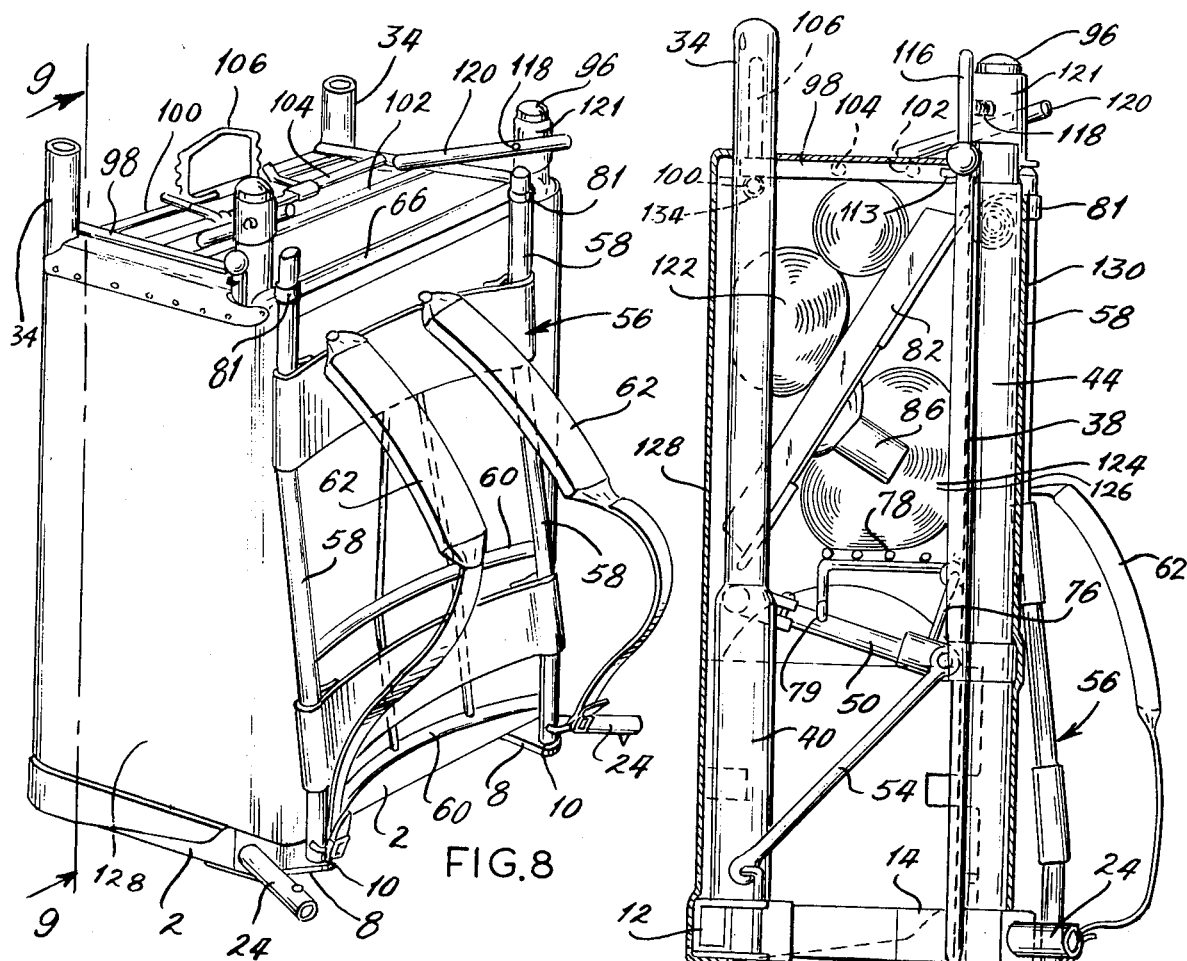
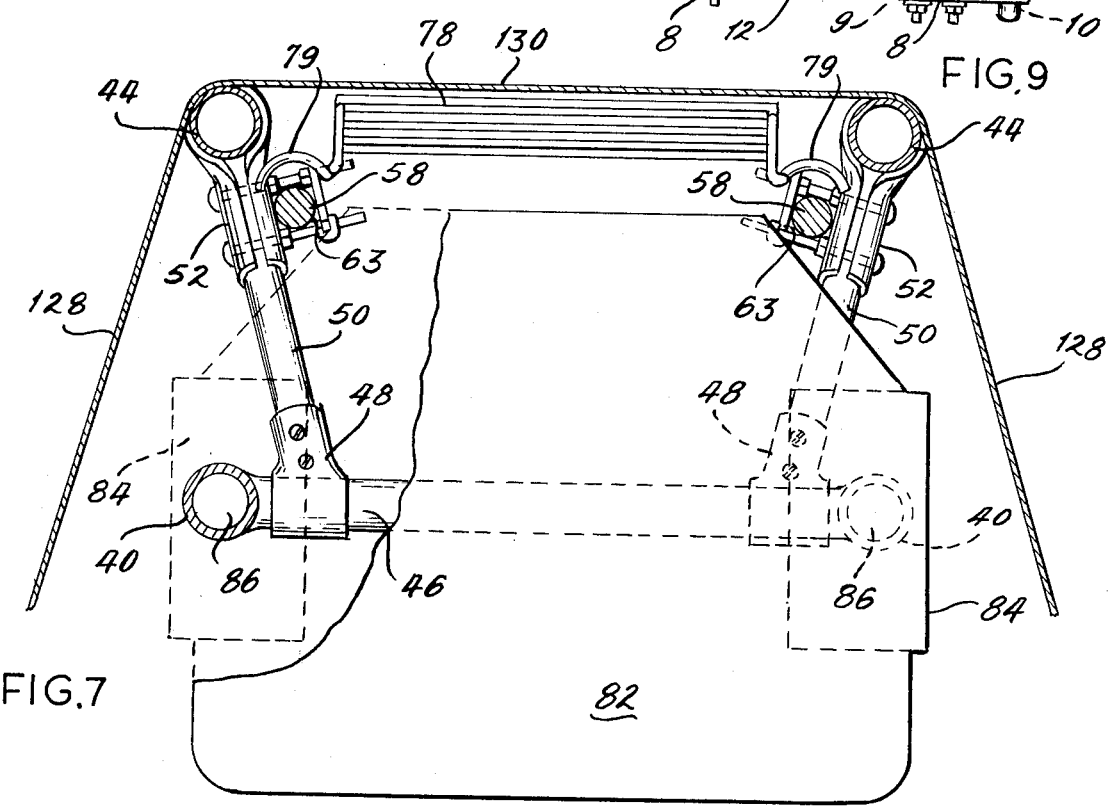

PORTABLE ENCLOSURE

BACKGROUND OF THE INVENTION

This invention relates in general to protective enclosures, and more particularly to such an enclosure which is highly portable and may be easily carried by the user thereof.

Hunters must often endure long hours in extremely unpleasant weather merely waiting for game to come close enough to afford a reasonable target. For example, duck hunters must sit in duck blinds in cold weather waiting for ducks to fly overhead. Likewise, dear hunters usually find it necessary to wait silently for deer to come within range, since any movement will alert the deer to their presence. The hunter who finds it necessary to remain substantially in one place during damp and cold weather becomes quite uncomfortable.

Ice fishermen likewise often endure the same discomforts, unless they are fortunate enough to have access to a hut constructed over a fishing hole in the ice. Even so, these huts are usually permanent for the duration of the ice fishing season. Hence, the fisherman is confined to the same location for the entire season. Moreover, where lakes freeze and thaw throughout the winter, such huts are not practical.

Aside from sportsmen, other individuals such as guards, news vendors, and the like often spend long hours exposed to inclement weather and in situations where it is impractical or not possible to construct permanent shelters for their protection.

SUMMARY OF THE INVENTION

One of the principal objects of the invention is to provide a protective enclosure which is highly portable in that it may be broken down into an extremely small configuration suitable for carrying on one's back. Another object is to provide a protective enclosure of the type stated which is heated. A further object is to provide a protective enclosure of the type stated which is ideally suited for use by hunters, fishermen, and others who must spend considerable time outdoors in the same location. An additional object is to provide a protective enclosure of the type stated which with additional components becomes a small raft suitable for fishing bodies of water. These and other objects and advantages will become apparent hereinafter.

The present invention is embodied in a portable enclosure which may be transformed into a relatively small carrying package. The enclosure includes a base, a seat, and may also include an overhead canopy as well as a back rest which also serves as a back pack. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur;

FIG. 1 is a perspective view of the enclosure of the present invention in its erected condition;

FIG. 4 is a rear elevational view of the enclosure in its erected condition and without its back curtain, the view being taken along line 4—4 of FIG. 2;

FIG. 7 is a sectional view taken along line 7—7 of FIG. 2 and showing the top of the seat;

FIG. 8 is a perspective view of the enclosure in the compact carrying condition;

FIG. 9 is a side elevational view of the enclosure in its compact carrying condition and without the side curtains, the view being along line 9—9 of FIG. 8.

DETAILED DESCRIPTION

Figure 2:
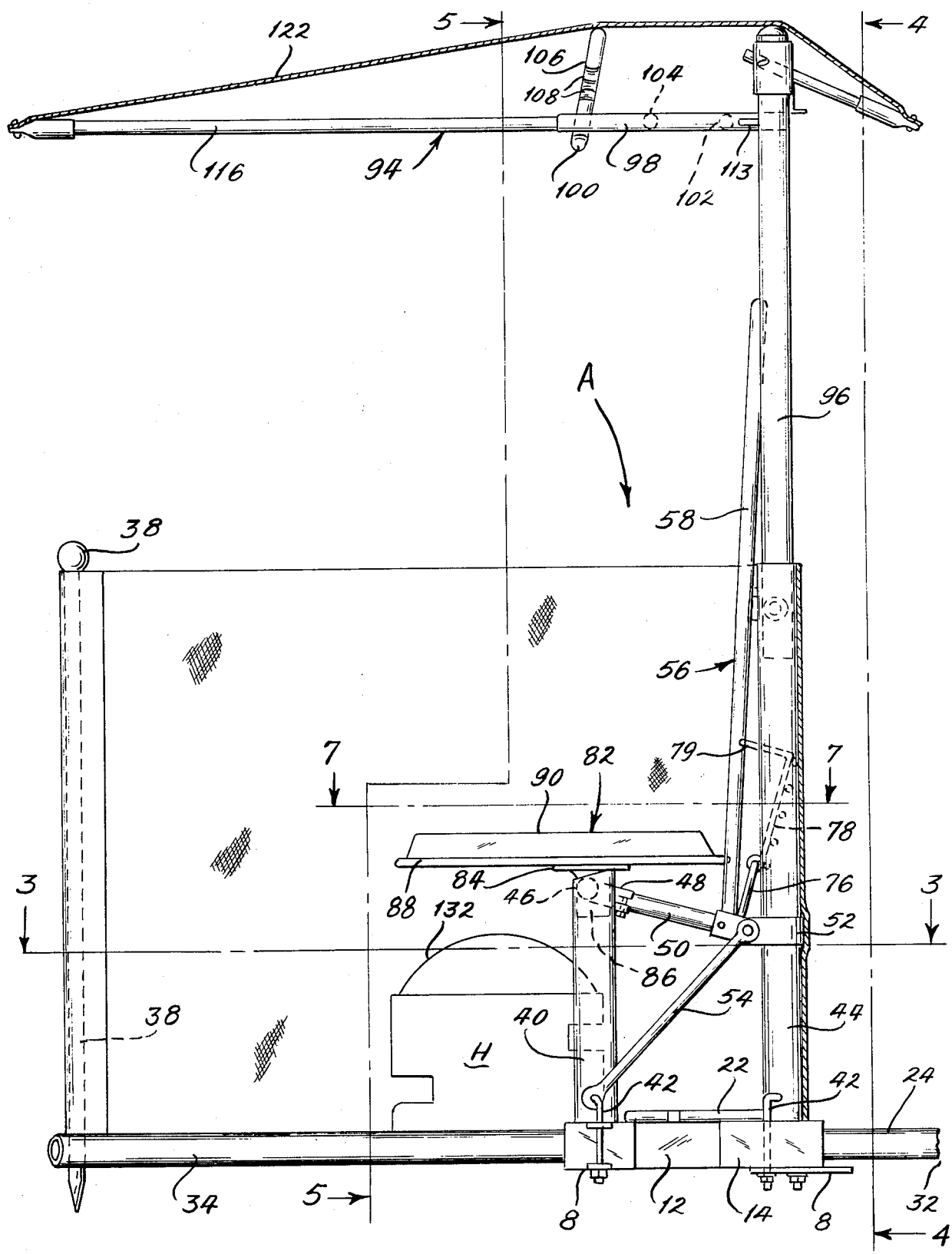
FIG. 2 is a side elevational view of the enclosure in its erected condition and without its side curtain, the view being along line 2—2 of FIG. 1.
Figures 2A, 5:
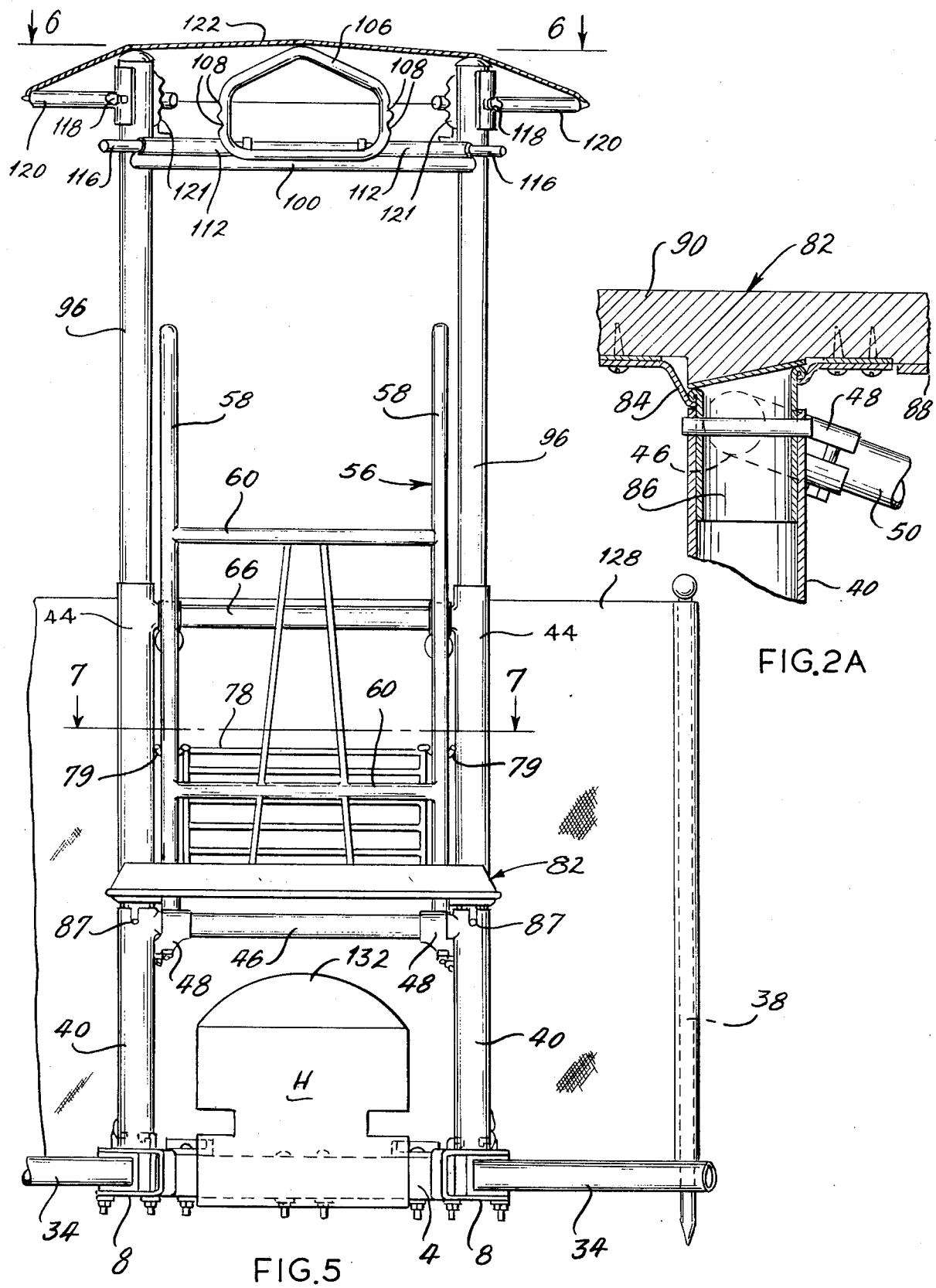
FIG. 2A is a sectional view of the seat where it is supported on the seat posts.
FIG. 5 is a front elevational view taken along line 5—5 of FIG. 2 and generally showing the enclosure from the front.

Referring now to the drawings (FIG. 1), A designates a protective enclosure which may with little effort be transformed from a highly compact carrying condition (FIGS. 8 and 9) to an erected condition (FIGS. 1–7) and vice-versa. In the erected condition, the enclosure A is capable of holding an individual in the sitting position and protecting that individual on all sides from rain and snow, as well as chilling winds. The enclosure A has a heater H for warming the space enclosed thereby.

The protective enclosure A, which will initially be considered in its erected condition, includes a base 2 (FIG. 3) having channels 4 and 6 extending along its front and rear margins, respectively. The front channel 4 turns forwardly at its ends, whereas the rear channel 6 turns rearwardly at its ends, and the ends of each of the channels 4 and 6 at the flanges thereon are fitted with enlarged horizontal end plates 8. Thus, at each corner of the base 2 there is an end plate 8. The forward end plates 8 may be the flanges on the front channel 4, while the rear end plates 8 may be in part formed from the flanges on the rear channel 6. Each rear end plate 8 has a pole retaining aperture 9 and a back pack socket 10. Joining the channels 4 and 6 rigidly to one another are a pair of oblique frame members 12 which converge rearwardly and at their rear ends are attached to the web of the rear channel 6 slightly inwardly from the end plate 8 on that channel. The forward ends of the oblique members 12 are disposed between the end plates 8 at each end of the front channel 4. The oblique members 12 are cut from square tubing and intermediate their ends they have apertures in their sidewalls to receive crossing oblique frame members 14 which are likewise formed from square tubing, but are slightly smaller in height so as to fit through the members 12. The oblique members 14 converge forwardly and have their forward ends adjacent to each other where they are bolted to a front fitting 16. The front fitting 16 in turn is attached to the web of the front channel 4. The rear ends of the oblique members 14, on the other hand, extend between the plates 8 at the ends of the rear channel 6, to which they are fastened. The four oblique members 12 and 14, and the front and rear channels 4 and 6, form a frame which is covered by a light weight sheet metal floor 20. Attached to the floor are a pair of positioning ribs 22 which define a polygonal area capable of accommodating the heater H when the enclosure A is in its compact carrying condition.

Projecting from the rear ends of the oblique members 14 are rear stabilizing arms 24 (FIG. 3) which are circular tubes small enough in diameter to telescope into and out of the members 14. Each arm 24 may be pulled out of its oblique members 14 to an extended stabilizing position in which it is located about 14 inches from the end of the member 14. Moreover, each arm 24 has a tab 26 at its inner end. The tab 26 is normally projected at about 45° so to be located in the void between cylindrical surface of the arm and rectilinear corner of the square oblique member 14 (FIG. 3A). The tab 26 engages a stop 28 in the surrounding oblique member 14 to prevent the arm 24 from coming out of the member 14. When the arm 24 is moved inwardly to its retracted position and turned, the tab 26 will engage a slot 30, the oblique member 14, thereby preventing the arm 24 from being drawn outwardly (dotted line position in FIG. 3A). Even when the stabilizing arms 24 are in the fully retracted positions they still project beyond the rear ends of the oblique members about 6 inches. The arms 24 are retained in the retracted position by the tabs 26. This projection of the tubes 24 enables them to be used as a handle for carrying the enclosure A when it is in the compact carrying position. Each arm 24 at its exposed end has a ground pin 32 which projects downwardly and will easily enter ground or ice when the base 2 is set down.

The large oblique members 12 at their forward ends receive forwardly directed stabilizing arms 34 (FIG. 3) which are relatively long circular tubes and are located in the axial direction by pins 36 extended through the oblique members 12. The pins 36 also locate the arms 34 in the circumferential direction since the arms 34 have at their rear ends notches which receive the pins 36. The two stabilizing arms 34 diverge forwardly and at their forward ends have apertures into which upright front poles 38 (FIG. 2) are fitted. These poles project completely through the stabilizing arms 34 and below the arms 34 are pointed so that they may be easily forced into the earth to anchor the enclosure A and prevent it from being skidded by wind. The poles 38 are hollow and are slightly smaller in diameter than the pole retaining apertures 9 on the rear end plates 8 so that they may be received in those apertures when the enclosure A is in its carrying condition.

Figure 3:
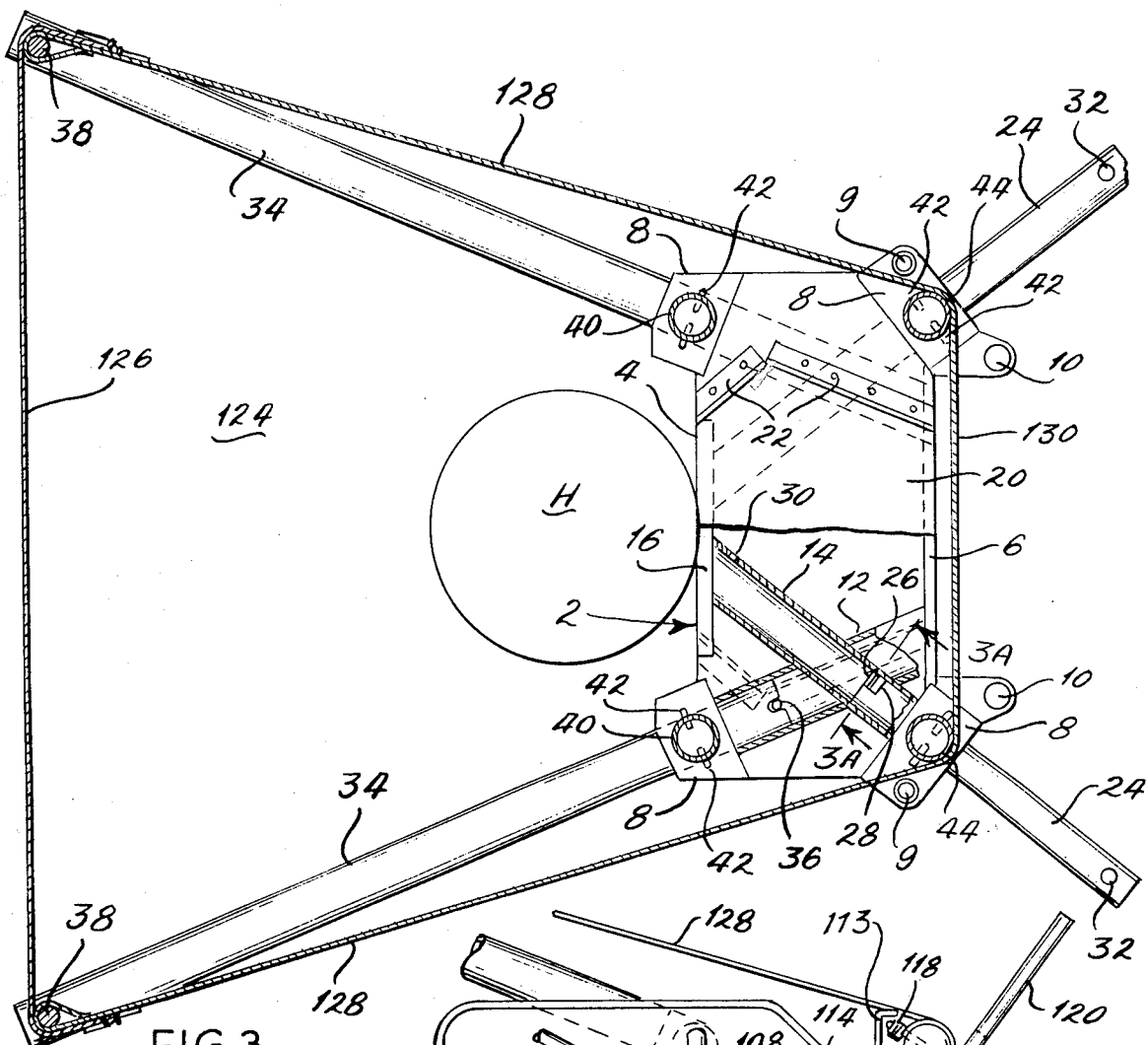
FIG. 3 is a sectional view taken along line 3—3 of FIG. 2 and showing the base in plan and partially broken away.
Figure 3A:
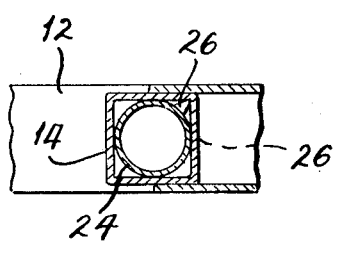
FIG. 3A is a sectional view taken along line 3A—3A of FIG. 3.

Projecting upwardly from the end plates 8 at the forward corners of the base 2 are hollow seat posts 40 (FIGS. 2 and 3). These seat posts are anchored to the plates 8 by means of angle bolts 42 which at their upper ends project laterally through the sides of the posts 40 and then extend downwardly through the plates 8 at each forward corner of the base 2 to be secured at their lower ends by nuts. The end plates 8 at the ends of the rear corners of the base 2 on the other hand, have back or canopy posts 44 secured to them by angle bolts 42 which extend through those rear end plates 8. The seat posts 40 and back posts 44 are parallel, but the latter are considerably higher than the former. The two seat posts 40 are connected near their upper ends by a tubular cross member 46 (FIG. 5), and this cross member 46 near its ends has collar-type fittings 48 (FIGS. 2 and 4) to which upper braces 50 are connected. The upper braces 50 extend rearwardly and at their rear ends are connected to the back posts 44 by more collar-type fittings 52. Extended between the rear fittings 52 and the lateral portions of the angel bolts 42 at the lower ends of two seat posts are diagonal struts 54 (FIG. 2). The brace 50 and strut 54 on each side maintain the seat and back posts 40 and 44 parallel and completely rigid with respect to one another and to the base 2.

The rear fittings 52 along the back posts 44 support a back rest 56 (FIGS. 2 and 4) which comprises a pair of parallel side tubes 58 joined together by several connecting tubes 60, with all the connecting tubes being bowed in the same direction. The back rest 56 is actually a conventional back pack, and as such further includes shoulder straps 62 (FIG. 8). Each shoulder strap 62 at its one end is attached to one of the parallel tubes 58 and at its opposite end to endmost connecting tubes 60. When the back rest 56 is utilized as a back rest, the bowed connecting tubes 60 are positioned with their concave surfaces presented forwardly. Moreover, the lower ends of the side tubes 58 are received in apertures 63 (FIG. 7) in the rear fittings 52, while the intermediate portions of the tubes 58 lie against a cross member 66 extended between the upper ends of the back posts 44.

The cross member 66 is hollow and contains a spring 70 (FIG. 4) and detent lugs 72 which are urged axially outwardly by the spring 70. The detent lugs 72 normally project into the interiors of the two back posts 44, but may be retracted therefrom by small thumb actuators 74 extending rearwardly from the cross member 66.

Projecting upwardly from the rear fittings 52 to which the braces 50 are attached is a pivot bracket 76 (FIGS. 2 and 7) on which a storage rack 78 is mounted. That rack 78 may pivot from a generally upright position where it is located generally between the two back posts 44 to a storage position wherein it is disposed generally horizontally at about the elevation of the upper ends of the seat posts 40. At its forward end the rack 78 has contoured feet 79 which rest upon the braces 50 and support the rack 78 in the horizontal disposition.

The cross member 66 carries a pair of retaining rings 81 (FIGS. 4 and 8) which are capable of projecting rearwardly and are sized to receive side tubes 58 on the back rest 56 when the enclosure A is in its compact carrying condition.

The hollow seat posts 40 support a seat 82 (FIGS. 2 and 7) including a metal base plate 84 which is separated from the remainder of the seat 82 by a material such as Bakelite which does not conduct heat readily. The plate 84 at the sides of the seat 82 has two cylindrical bosses 86 projected downwardly from it generally midway between its ends, and these bosses 86 are received in the upper ends of the hollow seat posts 40. Each boss 86 carries a locating pin 87 which fits into notches in the upper end of the seat post 40 for that boss 86. The upper ends of the bosses 86 are inclined as are the lower surfaces of the plates 84 (FIG. 2A), and further the bosses 86 are rotatable on the plates 84. Thus, by turning the bosses 86 it is possible to change the inclination of the seat 82 on the posts 40. Fastened to the underside of the plate 84 is a rim 88 formed from a material such as wood or fiberglass which does not conduct heat readily. This rim 88 forms the periphery of the seat 82 at the front and rear thereof. The upper portion of the seat 82 is covered with a hard plastic material 90, and underlying the material 90 is a suitable insulative material which may be layers of corrugated paperboard. The bottom layer of insulative material is separated from the base plate 84 by a layer of asbestos. The seat 82 is easily detached from the seat posts 40 by merely lifting it upwardly.

The hollow back posts 44 support a canopy 94 (FIGS. 2 and 4–6) including a pair of upper posts 96 which are telescoped into the back posts 44 and may be moved between extended and retracted positions. When in the retracted position (FIG. 9), the upper posts 96 extend only a few inches beyond the upper ends of the back posts 44 and are retained in this position by the spring loaded detent lugs 72 housed in the cross member 66. When in the extended position (FIGS. 1, 2, 4 and 5) the upper posts 96 project considerably beyond the ends of the back posts 44, and indeed the projection is sufficient to enable the major portion of the canopy 94, which portion is carried on the upper ends of the posts 96, to be above the head of an individual who is sitting on the seat 82. The lugs 72 likewise hold the upper posts 96 in their extended positions.

Figure 6:
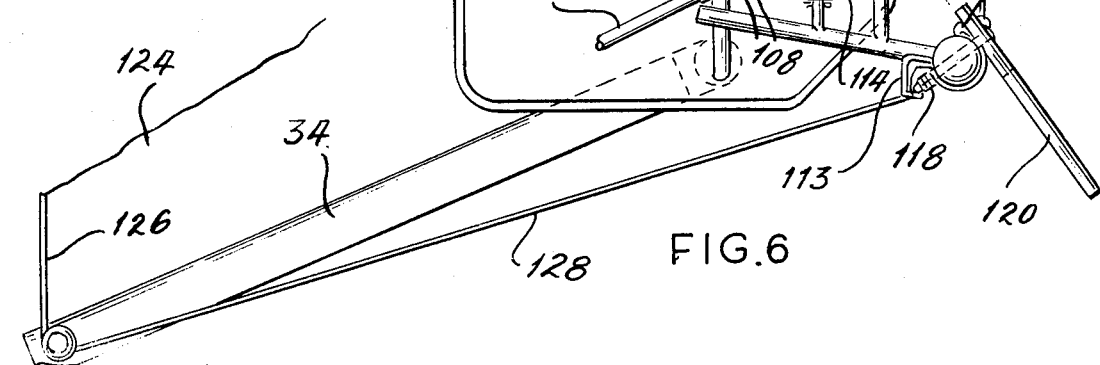
FIG. 6 is a top plan view of the canopy in its erected condition and without its cover, the view being taken along line 6—6 of FIG. 5.

Projecting forwardly from the upper end of each upper post 96 is a side tube 98, and the two side tubes 98 are connected by front, rear, and intermediate tubes 100, 102 and 104, respectively (FIG. 6). The front tube 100 is attached to the undersides of the side tubes 98, and between the side tubes 98 it carries a generally upright positioning ring 106 having a pair of notches 108 opening out of each side. Encircling the intermediate, the tubes 104 are loosely fitted collars 110 to which diverging forward canopy tubes 112 are attached, and these canopy tubes 112 extend along the sides of the positioning ring 106. The canopy tubes 112 may rest on the front tube 100, in which case they assume a generally horizontal disposition, or they may be elevated and engaged with the notches 108 of the positioning ring 106, being urged into the notches 108 by side springs 114 on the intermediate tube 104. In that case, the tubes 112 assume an upwardly inclined disposition. The canopy tubes 112 project no further forwardly than about the front tube 100, but their forward ends receive extensions 116 (FIGS. 2 and 6) which extend forwardly a distance slightly greater than that of the forward stabilizing arms 34 connected into the base 2. Inasmuch as the extensions 116 are received in the canopy tubes 112, they assume the angular disposition of the canopy tubes 112 and diverge. The side tubes 98 also have arcuate retaining clips 113 (FIG. 2) attached to them and these clips are located above and align with the pole retaining apertures 9 in the rear plates 8.

Extended through the upper ends of the upper posts 96 are pivot pins 118 which carry rearwardly directed canopy tubes 120. The angular position of these tubes is determined by a notched collar 121 which fits around the upper post 96. The rear canopy tubes 120 may be swung forwardly to a compact position in which they rest on the rear tube 102 (dotted line position in FIG. 6).

The forward extensions 116 and the rear canopy tubes 120 support a fabric cover 122 which extends over the seat 82 to completely cover the individual on it. The cover 122 is normally in a horizontal position in which the forward canopy tubes 112 rest on the front tubes 100. However, to provide better vision it may be elevated slightly by moving it upwardly and engaging the forward canopy tubes 112 with the notches 108 in the positioning ring 106. To provide complete unobstructed vision overhead, the forward canopy tubes 112 may be completely disengaged from the positioning ring 106 and the cover 122 may be swing behind the posts 96.

The area between the forward stabilizing arms 34 is enclosed by a floor panel 124 which snaps onto the front channel 4 of the base 2 as well as onto the two stabilizing arms 34. Moreover, the floor panel 124 at the forward ends of the stabilizing arms 34 merges into a front curtain 126 which extends upwardly along the end poles 38. Along the sides of the seat 82 are side curtains 128 which snap onto the back posts 44 and are secured to the sides of the bottom curtain 124 by zipper or other connectors. The fronts of the curtains 128 are attached to the end poles 38. Behind the seat 82, the area between the two back posts 44 is closed by a back curtain 130. Normally, this is enough protection for hunters or fishermen, but further protection may be provided by attaching a flexible transparent material (not shown) between the canopy 94 and the upper ends of the front, side, and back curtains 126, 128 and 130. The curtains 124, 126, 128 and 130 are all formed from a suitable water repellant fabric. The added transparent material is attached such that a vent is formed at the upper ends of the upper posts 96 due to the arch in the canopy cover 122 at that location.

Disposed beneath the seat 82 is the heater H which rests upon the bottom panel 124 immediately adjacent to the front channel 4. The heater H may be a conventional catalytic heater. A suitable heater is manufactured by the Coleman Company of Wichita, Kansas. A heater of this construction has a domed head 132 formed from a woven asbestos material containing a suitable catalyst such as platinum. This head absorbs a liquid fuel much like a wick and the fuel is burned within the head 132. However, due to the presence of the catalyst the combustion occurs at a very low temperature and indeed that temperature is low enough to prevent igniting paper and other normally combustible materials. The base of the heater H is small enough to fit in the polygonal area defined on the base 2 by the positioning ribs 22.

OPERATION

In use, the sportsman or another individual enters the enclosure by disconnecting one of the side curtains 128 from the front panel 126. He then reconnects those curtains 126 and 128 and sits upon the seat 82. The heater H supplies sufficient heat to make the interior of the enclosure A quite comfortable, and the canopy 94 as well as the front, side and back curtains 126 and 128 prevent rain or snow from entering the enclosure A. Moreover, the side, front and back curtains 126, 128 and 130 prevent chill winds from blowing through the enclosure A. Should the user desire a better view for observing overhead objects, such as flock of ducks, he may push the canopy cover 122 upwardly and engage the forward canopy tubes 112 with the notches 108 in the positioning ring 106. This holds the cover 122 at a higher angle. Where full overhead vision is desired, the canopy cover 122 may be pushed to a generally vertical disposition, in which case the canopy tubes 112 are completely free of the positioning ring 106.

Once the individual no longer needs the enclosure for protection, it is quickly and simply reduced to the compact carrying configuration (FIGS. 8 and 9).

To convert the enclosure A to its compact carrying condition, the seat 82 is removed from the posts 40. After detaching the lower portion of the back curtain 130, the heater H is passed between the back posts 44 and positioned on the floor 20 between the positioning ribs 22 which prevent the heater H from sliding off of the base 2. Also, the fabric canopy cover 122 is detached from the extensions 116 and the rear canopy tubes 120 and is rolled into a small bundle. Thereafter, the extensions 116 are removed from the forward canopy tubes 112, while the rear canopy tubes 120 are folded forwardly to the position on which they rest on the rear cross tube 102. The extensions 116 are inserted into the upper ends of the forward poles 38 while the poles 38 are removed from the forward stabilizing arms 34. The side curtains 128 remain attached to the poles 38. Next, the forward stabilizing arms 34 are removed from the oblique members 12. The notched ends of the stabilizing arms 34 are inserted into the seat posts 40 so that the arms 34 assume an upright disposition parallel to the back posts 44. Near their upper ends the arms 34 have apertures 134 (FIG. 9) which receive the ends of the front tube 100. When the arms 34 are initially inserted into the seat posts 40 the alignment between the apertures 134 and the ends of tube 100 is easily achieved.

The back rest 56 is then removed from the rear fitting 52 and after being turned around, the lower ends of the side tubes 58 thereon are fitted into the sockets 10 in the rear end plates 8 while upper ends of the tubes 58 are fitted into the retaining rings 81 extended rearwardly from the cross member 66. When the back rest 56 is so disposed, the concaved faces of the bowed connecting tubes 60 thereon are presented rearwardly, that is, away from the major portion of the enclosure A.

The rolled canopy cover 122 is placed on the storage rack 78 which is lowered to its horizontal position wherein its contoured feet 79 rest upon the braces 50. The combined front curtain 126 and bottom panel 124 are likewise rolled into a small bundle, and this bundle is placed upon the rack 78. Once the cover 122 and the curtain-panel 124 and 126 are in place on the rack 78, the seat 82 is placed over them at a substantial angle so that it does not project beyond the seat posts 40.

Thereafter, the upper posts 96 are lowered to their retracted positions by withdrawing the detent lugs 72 from the back posts 44 and allowing the upper posts 96 to drop downwardly through the back posts 44. As the canopy 94 descends so do the arms 34 which are engaged with the forward ends of the side tubes 98. Indeed, the notches in the lower ends of the arms 34 form around the angle bolts 42 at the lower ends of the seat posts 40 to permit maximum descent of the arms 34. The engagement between the upper ends of the arms 34 and the forward ends of the side tubes 98 greatly rigidifies the enclosure A in its compact condition. When the canopy 94 is in its retracted position, the side tubes 98 and the positioning ring 106 thereof are located generally between the upright stabilizing arms 34 projecting from the seat posts 40. Indeed, this portion of the canopy 94 forms a convenient rest for supporting game or other objects.

Thereafter, the sides of the compact enclosure A are closed by the two side curtains 128. In particular, the one side curtain 128 is brought forwardly from the back post 44 to which it is attached and then wrapped around the corners formed by the two seat posts 40 and stabilizing arms 34 projecting from them. The pole 38 at the opposite end of this side curtain 128 is fitted into the retaining aperture 9 in the rear end plate 8 and is further engaged with the retaining clip 113 on the side tube 98 of the canopy 94. This holds the pole 38 in place as well as the side curtain 128 attached to it. The other side curtain 128 is wrapped around the compact enclosure A in the opposite direction and the pole 38 at the end thereof is secured in a like manner.

Finally, the rear stabilizing arms 24 are moved into the oblique base members 14 from which they extend and are retained in their retracted positions by engagement of the tab 26 with the slot 30 in the member 14. When so disposed, the rear stabilizing arms 24 project rearwardly from the base 2 about 6 inches.

Since the back rest 56 is located rearwardly from the back posts 44 with its concave face presented outwardly when the enclosure A is in its compact condition, the enclosure A is easily transported as a back pack. Indeed, the user merely fits his arms through the shoulder straps 62 and lifts the entire enclosure A up onto his back. The protruding rear stabilizing arms 24 serve as handles and assist the user in lifting the back pack arrangement as well as adjusting its position on the user's back.

The frame formed by the side tubes 98, and the front, back and intermediate tubes 100, 102 and 104 of the canopy 94, form a rack for carrying other gear or even game killed during a hunt.

The enclosure A is erected in the opposite sequence. Once erected, it may be secured by ropes and pegs with the ropes being attached to the upper ends of the back posts 44, just above the cross member 66.

MODIFICATION

Figure 10:
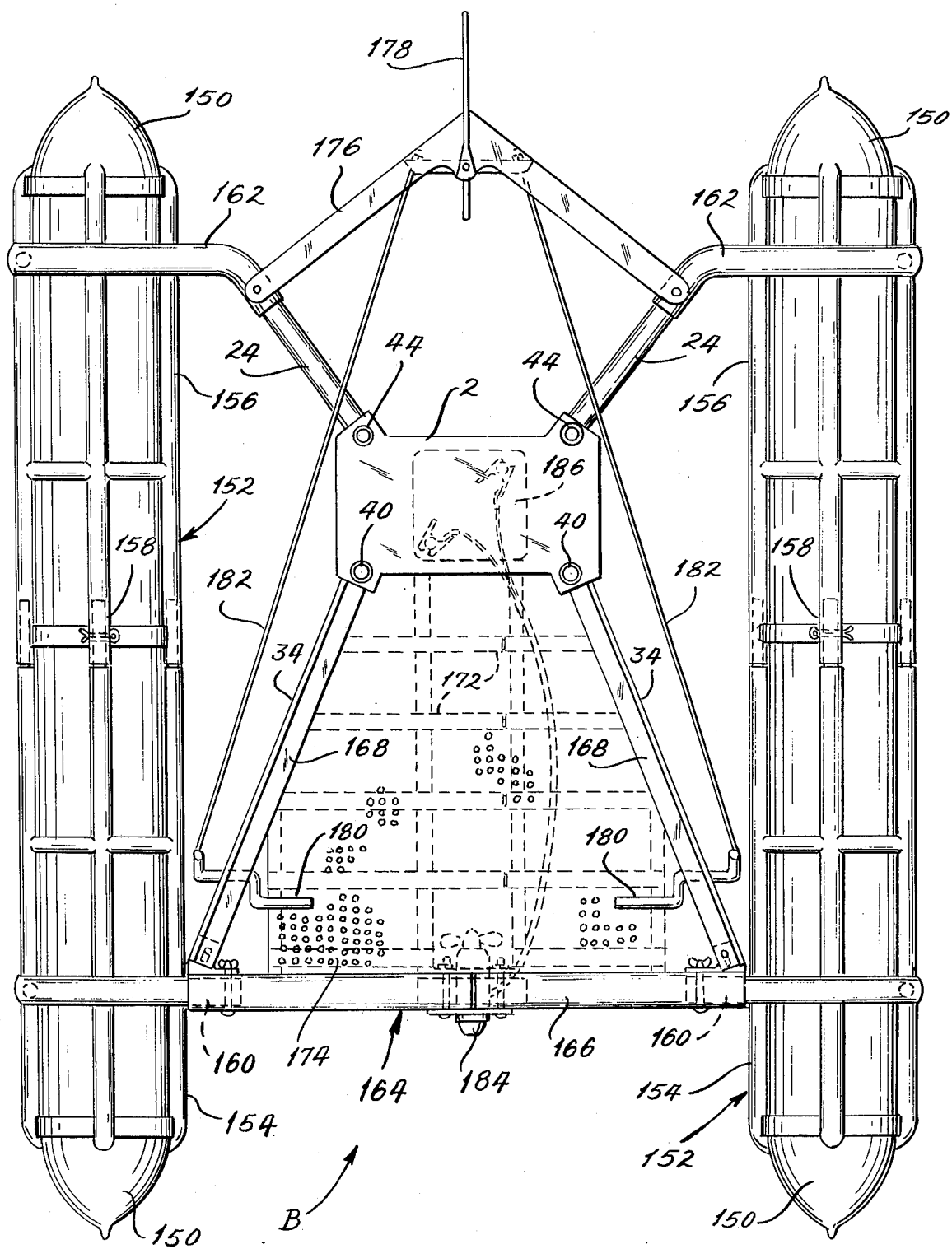
FIG. 10 is a plan view of the enclosure integrated into a pontoon platform.

When supported on a floating base or raft B (FIG. 10), the enclosure A is also suitable for fishing open bodies of water in relative comfort. The enclosure A when in its erected position rests entirely on and forms an integral part of the floating base B which floats on water. Like the enclosure A, the floating base B may be broken down for carrying and storage.

The floating base B includes a pair of inflatable pontoons 150 which are formed from a flexible material so that when they are deflated they may be rolled into a highly compact configuration. Each pontoon 150 is received in a light-weight tubular pontoon frame 152 which is separable at its center into front and rear sections 154 and 156, respectively. The two sections 154 and 156 are joined at telescopic connections 158. The front section 154 has a mounting rod 160 extended from it, while the rear section 156 has a hollow mounting tube 162 extended laterally from it. The tube 162 is somewhat longer than the rod 160 and further turns forwardly at its end.

The mounting rods 160 of the two pontoon frames 152 are attached to a center frame 164 which is disposed between the two pontoons 150 for supporting the erected enclosure A above the water. The connections between the frame 164 and the rods 160 and 162 are telescopic in nature to prevent the center frame 164 from pivoting relative to the pontoon frames 152. The center frame 164 includes a tubular front cross member 166, the ends of which receive the rods 160 projected from the front sections 154 of the pontoon frames 152. Extending rearwardly from the front cross member 166 are oblique channels 168, the flanges of which are presented horizontally and the web upright. The size, spacing, and angular disposition of the channels 168 are such that they receive the forward stabilizing arms 34 on the enclosure A when the enclosure A is erected. When the stabilizing arms 34 are so located, the base 2 of the enclosure A is positioned midway between the pontoons 150 and the rearwardly directed stabilizing arms 24 project toward and fit into the forwardly turned ends on the rear mounting tubes 162 for the pontoon frames 152. Extended between the oblique channels 168 is an underlying framework 172 to which a suitable decking 174 is affixed. This decking supports the heater H as well as the user's feet.

Connecting the forwardly turned ends of the rear mounting tubes 162 on the two pontoon frames 152 is a rear cross bar 176 having a rudder 178 hinged to it. The rudder 178 is controlled by foot pedals 180 mounted on the oblique channels 168 and connected to the rudder 178 by cables 182.

Mounted on the center of the front cross member 166 is a small electric motor 184 which is powered by a battery 186 carried on the base 2 of the enclosure A.

The connections between the center frame 164 and the pontoon frames 152 are of the quick disconnect variety as are the connections between the base 2 and the center frame 174 and the pontoon frames 152. Thus, the raft B is easily broken down to a small package which fits into the trunk of an automobile.

This invention is intended to cover all changes and modifications of the example of the invention herein chosen for purposes of the disclosure which do not constitute departures from the spirit and scope of the invention.

What is claimed is:

1. A portable enclosure comprising: a base; a seat supported above the base; canopy posts extending upwardly from the base; a canopy supported on the canopy posts and being movable between elevated and retracted positions, the canopy when in its elevated position being far enough above the seat to extend over and protect an individual sitting on the seat and when in its retracted position being low enough to enable the enclosure to be easily carried; and a back rest contoured to fit against the user's back when the user is sitting on the seat and to also fit against the user's back when the canopy is retracted and the enclosure is carried on the user's back, the back rest having a concave side and being mountable in two fixed positions with respect to the canopy posts, the back rest in the first position being directly behind and having its concave side presented toward the seat, the back rest in its second position being further behind the first position and having its concave side presented in the opposite direction so that it will fit comfortably against the user's back when the enclosure is carried as a back pack, the back rest further having shoulder straps for carrying the enclosure as a back pack.

2. A portable enclosure according to claim 1 wherein the canopy includes upper posts which telescope into the canopy posts to enable the canopy to move between its elevated and retracted positions, a framework at the upper ends of the upper posts and a cover supported on the framework and extended over the seat.

3. A portable enclosure according to claim 2 wherein the canopy includes socket elements on the framework and supported in a generally horizontal disposition by the framework, and extensions fitted into the socket elements and extending forwardly therefrom, the extensions supporting the cover and being removable from the socket elements.

4. A portable enclosure according to claim 3 wherein the socket elements pivot upwardly so that the extensions and cover may be raised upwardly to provide better overhead vision, and means for holding the socket elements in upwardly inclined positions.

5. A portable enclosure according to claim 1 and further comprising a heater beneath the seat; and wherein the base is provided with an area on which the heater is stored.

6. A portable enclosure according to claim 1 and further comprising a pair of spaced apart pontoons, a framework extended between the pontoons, the base being incorporated into said framework and forming a part thereof, whereby the enclosure may be used on a body of water.

7. A portable enclosure comprising: a base; seat posts extended upwardly from the base; a seat supported on the upper ends of the seat posts, the seat projecting forwardly from the seat posts when so supported and being detachable from the seat posts so that it can be stored in an inclined position with its front margin disposed considerably rearwardly; canopy posts extending upwardly from the base generally parallel to the seat posts; a canopy supported on the canopy posts and being movable between elevated and retracted positions, the canopy when in its elevated position being far enough above the seat to extend over and protect an individual sitting on the seat and when in its retracted position being low enough to enable the enclosure to be easily carried; connecting means between the seat and canopy posts for rigidifying the posts; and a storage rack on the connecting means, the storage rack after the seat is detached from the seat posts being movable between a rear position wherein it is located behind and does not interfere with the seat and a storage position wherein it is generally horizontal and assumes the position formally occupied by the seat.

8. A portable enclosure according to claim 7 wherein the seat posts are hollow at their upper ends, and the seat has protrusions which fit into the hollow upper ends of the seat posts and maintain the seat on the seat posts.

9. A portable enclosure comprising: a base; seat posts extending upwardly from the base; a seat supported on the seat posts; canopy posts extending upwardly from the base generally parallel to the seat posts; a canopy supported on the canopy posts and being movable between elevated and retracted positions, the canopy when in its elevated position being far enough above the seat to extend over and protect an individual sitting on the seat and when in its retracted position being low enough to enable the enclosure to be easily carried; and forward members connected to the base and extending forwardly therefrom, the forward members being detachable from the base, the forward members further being capable of fitting into the seat posts so that they can be carried in an upright position parallel to the canopy posts.

10. A portable enclosure according to claim 9 and further comprising front poles received in the forward ends of the forward members and projecting upwardly therefrom, and a front curtain extended between the front poles and at least partially closing the front of the enclosures, and side curtains extending between the front poles and the canopy posts and at least partially enclosing the sides of the enclosure.

11. A portable enclosure according to claim 10 wherein the canopy includes upper posts which telescope within the canopy posts to enable the canopy to move between its elevated and retracted positions, socket elements supported by the upper posts at the upper ends thereof, extensions projecting forwardly from the socket elements and being removable therefrom, and a cover supported on the extensions of the canopy; and wherein the front poles are hollow and are capable of receiving the extensions in their hollow interiors.

12. A portable enclosure according to claim 10 and comprising means for storing the poles adjacent to the canopy posts after they are removed from the forward members.

13. A portable enclosure according to claim 9 and further comprising rear stabilizing arms connected to the base and extending rearwardly therefrom.

14. A portable enclosure comprising: a base, seat posts projecting upwardly from the base; a seat on the seat posts; a back rest supported above the base and being movable between the back rest and back pack positions, the back rest when in the back rest position being located immediately behind the seat and when located in the back rest position being disposed for convenient positioning against the back of one carrying the enclosure.

15. A portable enclosure according to claim 14 and further comprising back posts located behind the seat posts and supporting the back rest, the back rest being located generally ahead of the back posts when in the back rest position and generally behind the back posts when in the back pack position.

16. A portable enclosure according to claim 14 and further comprising forward members projecting forwardly from the base, the forward members being removable from the base, and wherein the seat posts are hollow and will receive the forward members therein so that the forward members may be carried in an upright disposition.

* * * * *